US005683817A

United States Patent [19]
Kenmochi

[11] Patent Number: 5,683,817
[45] Date of Patent: Nov. 4, 1997

[54] POLYAMIDE COMPOSITION AND METHOD OF PRODUCING GOODS

[75] Inventor: Tsunao Kenmochi, Ikeda, Japan

[73] Assignee: E. I. Du Pont de Nemours and Company, Wilmington, Del.

[21] Appl. No.: 464,617

[22] PCT Filed: Dec. 28, 1993

[86] PCT No.: PCT/US93/12593

§ 371 Date: Jun. 23, 1995

§ 102(e) Date: Jun. 23, 1995

[87] PCT Pub. No.: WO74/14595

PCT Pub. Date: Jul. 7, 1994

[30] Foreign Application Priority Data

Dec. 28, 1992 [JP] Japan .................... 4-347556

[51] Int. Cl.$^6$ ................................ B32B 27/08
[52] U.S. Cl. .................. 428/474.4; 264/176.1; 524/322; 524/399; 524/432; 528/324; 528/339
[58] Field of Search ................... 524/322, 399, 524/432; 528/324, 339; 264/176.1; 428/474.4

[56] References Cited

U.S. PATENT DOCUMENTS

| | | | |
|---|---|---|---|
| 3,008,908 | 11/1961 | Ludewijk | 260/18 |
| 3,228,898 | 1/1966 | Illing et al. | 260/18 |
| 4,085,080 | 4/1978 | Elbert . | |
| 4,250,065 | 2/1981 | Phillips, Jr. . | |
| 4,408,000 | 10/1983 | Lee | 524/315 |
| 4,791,027 | 12/1988 | Reimann et al. | 428/407 |
| 4,970,255 | 11/1990 | Reimann et al. | 524/80 |
| 5,183,843 | 2/1993 | Sakai et al. | 524/318 |

FOREIGN PATENT DOCUMENTS

| | | |
|---|---|---|
| 280221 | 8/1988 | European Pat. Off. . |
| 1181978 | 6/1959 | France . |
| 11 42 696 | 10/1960 | Germany . |
| 28 29 625 | 1/1980 | Germany . |
| 2856457 | 7/1980 | Germany . |
| 203 737 | 11/1983 | Germany . |
| 51-11833 | 1/1976 | Japan . |

OTHER PUBLICATIONS

AN 86–223567 Abstract.
Supplementary European Search Report for PCT/US/12593, EP 94 90 5528, Jan. 1, 1996.

*Primary Examiner*—Terressa Mosley

[57] ABSTRACT

Certain polyamide resin compositions make it possible to shorten the injection molding processing cycle for polyamide resins. The polyamide resin compositions are obtained by adding an external lubricant to polyamide resin granules composed of from 55 to 85% by weight of polyamide resin, 10 to 40% by weight of filler, and 0.3 to 2.0% by weight of at least one type of higher fatty acid ester type internal lubricant selected from among esters of higher alcohols and higher fatty acids and higher fatty acid partial esters of polyhydric alcohol compounds.

6 Claims, No Drawings

POLYAMIDE COMPOSITION AND METHOD OF PRODUCING GOODS

BACKGROUND OF THE INVENTION

The molding process of synthetic resin consists of, first, a step whereby resin supplied from the material supply port (hopper) of the molding machine is melted by heating (plasticization step); second, a step whereby the plasticized resin is made to completely fill the screw groove or mold while kneading by applying shear force (injection/filling step); third, a step whereby the resin placed in the mold is solidified by cooling (cooling step); followed by a step whereby the molded product is discharged from the mold (mold release step).

In a continuous process, the plasticization step and the cooling step are generally conducted simultaneously in these processes. In other words, plasticization of the resin of a molding processing cycle is carried out while the resin placed in the mold in the immediately prior cycle is being cooled in the aforementioned molding processing cycle. Nonetheless, the time necessary for plasticization and cooling is longer than the time necessary for the injection and discharge steps.

Conducting molding at high molding efficiency and maintaining high quality of the molded goods are demanded when producing molded goods by injection molding processes. When using resins that solidify rapidly such as nylon and polystyrene and when molding thin-shaped molded goods, problems, such as short shots, arise because the injection speed slows during molding. Another problem is that injection cannot be continued by melting the resin inside the cylinder of the molding machine in the prescribed cycle time when the plasticization capacity of the resin is low during high cycle operation.

Prior to now, shortening of the plasticization time, which generally accounts for approximately 50% of the molding cycle time, was concluded to be the major factor contributing to shortening the molding processing cycle time to obtain higher productivity while avoiding the aforementioned problems. However, since the cooling time may be shorter than the plasticization time when the heat conductivity of the resin is large, the ability to shorten the plasticization time in some way should be the key to shortening the molding processing cycle. In other words, the molding cycle time, especially the duration of the plasticization step, controls the molding performance and quality of the molded goods. Therefore, attempts were made in the past to accelerate plasticization by raising the screw rotation while lowering the screw backpressure.

A molding method that resolves poor molding and molding defects directly associated with the molding process (such as valleys and short shots) while continually maintaining the necessary molding cycle time while operating the injection molding machine on a high cycle, and elucidation of an improved polyamide resin composition to be used in this method were demanded because of the situation described above. Shortening of the plasticization time while maintaining a high quality of the molded goods was demanded to attain the goal of shortening the molding cycle time.

In the plasticization step of the injection molding process, the resin material, granules, or pellets that have fallen into the heating cylinder for injection under their own weight from the hopper are placed in a molten condition by elevation of the temperature from inside (through the heat of friction generated by the kneading action) together with heat from the outer circumference of the heating cylinder while being mixed and kneaded by the rotations of the screw and carried to the tip of the cylinder through the groove. Molten resin is simultaneously stored in the tip of the heating cylinder. The reaction force (backpressure) of this material pushes the screw backward. The measurement step that determines the mount injected is subsequently carried out by controlling the mount of retraction by a limit switch and stopping the rotation of the screw at a set position.

SUMMARY OF THE INVENTION

In the present invention, it has been discovered that the combined use of an internal lubricant and external lubricant with polyamide resin has the greatest shortening effect on the plasticization time when molding polyamide resin. Nonetheless, it is evident that the cooling step acts in a rate determining manner and the injection molding cycle time will not be shortened by shortening the plasticization time in cases wherein the cooling step vastly exceeds the duration of the plasticization step (because the plasticization step and cooling step are carried out simultaneously, as was mentioned above). Therefore, the polyamide resin composition used in the present invention is a resin composition that contains a filler, and it is a requisite condition that the content of filler be from 10 to 40% by weight in a polyamide resin such that the cooling step does not act in a rate determining manner. The polyamide resin composition also contains 0.3 to 2.0% by weight of a higher fatty acid ester internal lubricant as well as an external lubricant.

The polyamide resin composition of the present invention is excellent for molding with lowered frictional resistance between the polyamide resin granules or pellets and the barrel and screw of the injection molding machine. Furthermore, the polyamide resin composition makes it possible to shorten the plasticization in the injection molding process and to thereby attain high molding performance.

DETAILED DESCRIPTION OF THE INVENTION

The present invention makes it possible to shorten the plasticization time while maintaining the quality of the molded goods in an injection molding process by using an internal and external lubricant in combination with a filler-containing polyamide resin composition. This makes it possible to shorten the molding processing cycle time and to thereby greatly improve productivity.

The present invention concerns a polyamide resin composition obtained by adding an external lubricant to polyamide resin granules or pellets, said polyamide resin granules or pellets comprising from 55 to 85% by weight of polyamide resin, 10 to 40% by weight of filler, and 0.3 to 2.0% by weight of at least one type of higher fatty acid ester internal lubricant selected from esters of higher alcohols and higher fatty acids or higher fatty acid partial esters of polyhydric alcohol compounds.

Moreover, the present invention also concerns a method of producing Injection molded polyamide resin goods using a polyamide resin composition obtained by adding an external lubricant to polyamide resin granules or pellets, said polyamide resin granules or pellets comprising from 55 to 85% by weight of polyamide resin, 10 to 40% by weight of filler, and 0.3 to 2.0% by weight of at least one type of higher fatty acid ester internal lubricant selected from esters of higher alcohols and higher fatty acids or higher fatty acid partial esters of polyhydric alcohol compounds.

The polyamide resin used in the present invention is a resin well known in the art. It is a high molecular weight substance wherein hydrocarbon groups or hydrocarbon groups broken by oxygen or sulfur are joined by amide bonds. This includes those that are generally called nylon and have a molecular weight of at least 5,000.

This polyamide resin can be one produced by condensing a linear diamine represented by the formula $H_2N-(CH_2)_x-NH_2$ (wherein x is an integer of from 6 to 12) and a linear dicarboxylic acid represented by the formula $HO_2C(CH_2)_y-CO_2H$ (wherein y is an integer of from 2 to 8). These polyamides can also be produced from amide-forming derivatives of said amine and acid, e.g., esters, acid chlorides, and amine salts. Examples of a dicarboxylic acid used in the production of this polyamide include butyric acid, adipic acid, pimelic acid, suberic acid, sebacic acid, and dodecane dioate. Examples of diamines include hexamethylenediamine and octamethylenediamine.

Another type of polyamide resin is produced by condensation of ω-aminocarboxylic acid represented by the formula $H_2N-(CH_2)_x-CO_2H$ (wherein x is an integer of from 3 to 12) or an intramolecular amide thereof.

The polyamides may also include polyamides wherein part of the diamine component is bis(3-aminopropyl)ether, bis(aminomethyl)cyclohexane, m-phenylenediamine, m-xylylenediamine, or 4,4'-diaminodiphenyl ether and pan of the dicarboxylic acid component is isophthalic acid, terephthalic acid, etc. Examples of the polyamides include polyhexamethylene adipamide (nylon 66), polyhexamethylene azelamide (nylon 69), polyhexamethylene sebacamide (nylon 610), polyhexamethylene dodecanoamide (nylon 612), polycaprolactam (nylon 6), polylauryl lactam, poly-11-amino-undecanoamide, and polybis-(p-aminocyclohexyl)methanedodecanoamide. The aforementioned polyamides also include copolymers and multicomponent polymers obtained by combining a number of the aforementioned monomers.

The polyamide resin composition of the present invention contains a filler made from inorganic compounds to improve the thermal and mechanical properties and obtain reinforcement. Examples of these fillers include glass fibers, especially crushed (milled) glass fibers with an aspect ratio of no more than 30, glass flakes, carbon fibers, wollastonite, talc, kaolin, calcium carbonate, diatomaceous earth, mica, and potassium titanate whiskers. One type or a combination of types of these fillers may be used. These fillers are added in an mount of from 10 to 40% by weight of the polyamide resin composition. When a smaller amount is used, the cooling step becomes rate determining and the object of the present invention, which is to shorten the injection molding cycle is not met. The internal lubricant contained in the polyamide resin composition of the present invention refers to a lubricant combined with the composition in such a way that it is present in a state integrally mixed with the composition. This is distinguished from the external lubricant which is used on the surface of the granules or pellets of the polyamide resin composition in the composition of the present invention.

The internal lubricant used in the present invention is selected from esters of higher alcohols and higher fatty acids and higher fatty acid partial esters of polyhydric alcohol compounds. These internal lubricants may be used individually or in combinations of two or more.

Esters of higher alcohols and higher fatty acids refers to esters of aliphatic alcohols having at least 12 carbon atoms and fatty acids having at least 16 carbon atoms. Included are esters of aliphatic alcohols having at least 12 carbon atoms such as lauryl alcohol, myristyl alcohol, palmityl alcohol, stearyl alcohol, eicosyl alcohol biphenyl alcohol, tetracosyl alcohol, serotinyl alcohol, and melissinyl alcohol and fatty acids such as lauric acid, myristic acid, palmitic acid, stearic acid, alginic acid, behenic acid, lignoceric acid, serotinic acid, and melissic acid. Examples include lauryl laurate, lauryl myristate, lauryl palmitate, lauryl stearate, lauryl behenate, lauryl lignocerate, lauryl melissate, myristyl laurate, myristyl myristate, myristyl stearate myristyl behenate, myristyl lignocerate, myristyl melissate, palmityl laurate, palmityl myristate, palmityl stearate, palmityl behenate, palmityl lignocerate, palmityl melissate, stearyl laurare, stearyl myristate, stearyl palmitate, stearyl stearate, stearyl behenate, stearyl alginate, stearyl lignocerate, stearyl melissate, eicosyl laurate, eicosyl palmitate, eicosyl stearate, eicosyl behenate, eicosyl lignocerate, eicosyl melissate, biphenyl laurate, biphenyl melissate, biphenyl palmitate, biphenyl stearate, biphenyl behenate, biphenyl alginate, biphenyl melissate, tetracosanyl laurate, tetracosanylpalmitate, tetracosanylstearate, tetracosanylbehenate, tetracosanyl lignocerate, tetracosanyl serotate serotinyl stearate serotinyl behenate, serotinyl serotinate, melissyl laurate, melissyl stearate, melissyl behenate, and melissyl melissate.

Partial esters of polyhydridic alcohols and higher fatty acids refers to mono-, di-, or triesters of polyhydric alcohols such as glycerin, 1,2,3-butanetriol, 1,2,3-pentanetriol, erythritol, pentaerythritol, trimethylopropane, mannitol, and sorbitol and higher fatty acids such as lauric acid, myristic acid, palmitic acid, stearic acid, eicosanoic acid, behenic acid, lignoceric acid, serotinic acid and melissic acid. Examples include higher fatty acid monoglycerides such as glycerin monolaurate, glycerin monomyristate, glycerin monostearate, glycerin monobehenate, glycerin monolignocerate, and glycerin monomelissate, mono- or di-higher fatty acid esters of pentaerythritol such as pentaerythritol mono- or dilaurate, pentaerythritol mono- or dimyristate, pentaerythritol mono- or dipalmitate, pentaerythritol mono- or distearate, pentaerythritol mono-, or dibehenate, pentaerythritol mono- or dilignocerate, and pentaerythritol mono- or dimelissate, mono- or di higher fatty acid esters of trimethylopropane such as trimethylopropane mono- or dilaurate, trimethylopropane mono- or dimyristate, trimethylopropane mono- or dipalmitate, trimethylopropane mono- or distearate, trimethylopropane mono-or dibehenate, trimethylopropane mono- or dilignocerate, and trimethylolpropane mono- or dimelissate, sorbitan mono-, di-, or tri-higher fatty acid esters such as sorbitan mono- di- or trilaurate, sorbitan mono-, di- or trimyristate, sorbitan mono- di- or tristearate sorbitan mono-, or di, or tribehenate, sorbitan mono-, di-, or trilignocerate, sorbitan mono-, di-, or trimelissate and mannitan mono-, di, or tri higher fatty acid esters such as mannitan mono-, di-, or trilaurate, mannitan mono-, di-, or trimyristate, mannitan mono-, di-, or tripalmitate, mannitan mono-, di-, or tristearate, mannitan mono-, di-, or tribehenate, mannitan mono-, di-, or trilignocerate, and mannitan mono-, di-, or trimelissate.

The aforementioned polyamide resin, filler, and internal lubricant are first mixed in the prescribed proportions and blended homogeneously using a kneader. The kneader used may be a uniaxial extruder, biaxial extruder, or other compounder. A polyamide bulk material in the form of pellets or particles is produced in this way.

The external lubricant is next added to the polyamide bulk material obtained in this way. The external lubricant is satisfactory as long as it acts to decrease the friction between the polyamide resin and the injection molding machine barrel and screw. Commonly known lubricants such as hydrocarbon oil, higher aliphatic alcohols, higher fatty acids, fatty acid metal salts, fatty acid esters, and fatty acid amide derivatives may be used. These external lubricants are applied to the polyamide granules or pellets by a method such as stirring in a dosed container using a blender such as a cone blender or a rotating pan or by applying molten lubricant. These external lubricants are applied in a quantity of from about 0.3 to 3% by weight in relation to the polyamide resin composition.

Additives commonly added to polyamide resin, e.g., stabilizers and inhibitors of deterioration by oxidation, heating, and ultraviolet rays, mold release agents, coloring agents (including dyes and pigments), plasticizers, nucleating agents, etc., can also be combined with the composition of the present invention.

EXAMPLES

The present invention is further illustrated in the examples that follow. The present invention is not limited to the examples.

Examples 1 to 3

For Examples 1 to 3, glass fibers (33% by weight) with a mean fiber diameter of 13 microns and 0.5, 0.75 and 1.0% by weight of behenic monoglyceride were respectively added to 66.5, 66.25 and 66% by weight of additive-free, dried nylon 66 pellets and mixed in a blender. The mixture obtained was molten mixed at a temperature of 280° C. and screw rotational count of 280 rpm while producing a vacuum using a biaxial screw extruder (9-barrel) (ASK-40 made by W&P). Pellets for molding were obtained by quenching the molten strands extruded from the die in a water bath and pelletizing with the pelletizer of a cantilevered cutter. The pellet surface was then coated with external lubricant using 0.1 part by weight of aluminum distearate per 100 parts by weight of these pellets. The pellets that contained these internal and external lubricants were continuously injection molded at a cylinder temperature of 270° C., injection pressure of 700 kg/cm$^2$, mold temperature of approximately 70° C., and cooling time of 12 seconds with an injection molding machine SYCAP H111 165/75 made by Sumitomo Necktaryl) with a screw diameter of 28 mm, nozzle diameter of 15 mm, and nozzle hole diameter of 5 mm. Table 1 shows the results obtained by examining and testing the screw retraction time and total cycle time in each of the injection molding processes, the mechanical strength of the injection molded goods obtained, and the existence of poor molding/molding defects.

TABLE 1

|  | Example 1 | Example 2 | Example 3 |
| --- | --- | --- | --- |
| Internal lubricant | Behenic monoglyceride 0.5 | Behenic monoglyceride 0.75 | Behenic monoglyceride 1.0 |
| External lubricant | Aluminum distearate | Aluminum distearate | Aluminum distearate |
| Screw retraction time | 10.2 | 8.4 | 7.1 |
| Total cycle time | 18.7 | 18.8 | 18.6 |
| Tensile strength (kg/cm$^2$) | 1877 | 1902 | 1813 |
| Tensile elongation on rupture (%) | 2.96 | 3.01 | 2.83 |
| Flexural modulus of elasticity (kg/cm$^2$) | 90,936 | 90,610 | 90,026 |
| Flexural strength (kg/cm$^2$) | 2697 | 2625 | 2612 |
| Notched Izod impact strength (kg-cm/cm) | 11.64 | 11.15 | 10.88 |

Example 4 and Comparative Examples 1 to 4

For Comparative Examples 1 to 4, pellets for molding were produced by mixing in the same way as in Example 1 a composition with no internal lubricant added to 66.5 parts by weight of dried nylon 66 pellets and 33 parts by weight of glass fibers with a mean fiber diameter of 13 microns. This composition served as Comparative Example 1. Furthermore, compositions with 0.3 part by weight of aluminum distearate (Comparative Example 2), 0.5 part by weight of calcium behenate (Comparative Example 3), 0.5 pan by weight of polyethylene glycol distearate (Comparative Example 4), and 0.5 part by weight of behenyl behenate added as an internal lubricant (Example 4) were prepared. The pellet surface for each comparative example, and Example 4, was coated with 0.1 pan by weight of aluminum distearate per 100 parts by weight of these pellets as an external lubricant. The pellets obtained in this way were injection molded into Izod test pieces in the same way as in practical Example 1. The screw retraction time and total cycle time in the injection molding process, the mechanical strength of the injection molded goods obtained, and the existence of poor molding/molding defects were tested and observed. The results are shown in Table2.

TABLE 2

|  | Comparative Example 1 | Comparative Example 2 | Comparative Example 3 | Comparative Example 4 | Example 4 |
| --- | --- | --- | --- | --- | --- |
| Internal lubricant | None | Aluminum distearate 0.3 | Calcium behenate 0.5 | Polyethylene glycol distearate 0.5 | Behenyl behenate 0.5 |
| External lubricant | Aluminum distearate | Aluminum distearate | Aluminum distearate | Aluminum distearate | Aluminum distearate |
| Screw retraction time | 11.3 | 11.7 | 12.2 | 12.2 | 8.7 |
| Total cycle time | 18.7 | 18.7 | 19.0 | 19.1 | 18.6 |
| Tensile strength (kg/cm$^2$) | 2016 | 1843 | 1856 | 1816 | 1931 |
| Tensile elongation on rupture % | 3.03 | 2.92 | 2.94 | 3.22 | 2.71 |
| Flexural modulus of elasticity (kg/cm$^s$) | 94,412 | 93,881 | 90,981 | 91,186 | 86,060 |
| Flexural strength (kg/cm$^2$) | 2968 | 2682 | 2680 | 2707 | 2847 |
| Notched Izod impact strength (kg-cm/cm) | 11.97 | 11.40 | 11.13 | 11.20 | 12.62 |

As is evident from Tables 1 and 2, shortening of the plasticization time is found by adding from 0.3 to 2.0% by weight of the total quantity of these internal lubricants melted and mixed by extruder when using ester type lubricants in combination as external lubricants and internal lubricants. The mechanical strength properties of the molded goods were in no way changed in comparison to molded goods obtained from pellets that did not contain internal lubricants. Poor molding and molding defects such as valleys and short shots also did not arise.

What is claimed is:

1. A process for preparing a coated polyamide resin pellet for use in injection molding, comprising providing polyamide resin pellets comprising from 55 to 85% by weight of a polyamide resin, 10 to 40% by weight of a filler, and 0.3 to 2.0% by weight of an internal lubricant selected from the group consisting of (a) esters of higher alcohols and higher fatty acids, and (b) partial esters of polyhydridic alcohols and higher fatty acids, and coating the pellet surface with from about 0.3 to 3.0% by weight, in relation to the polyamide resin pellets, of an external lubricant.

2. A process of claim 1, wherein the external lubricant is selected from the group consisting of hydrocarbon oil, higher aliphatic alcohols, higher fatty acids, fatty acid metal salts, fatty acid esters and fatty acid amide derivatives.

3. A coated polyamide resin pellet exhibiting improved plasticization properties when used in injection molding prepared in prepared in accordance with the process of claim 1.

4. In a process for preparing injection molded polyamide parts by providing polyamide resin pellets comprising polyamide resin and a filler, plasticizing the polyamide resin pellets and injection molding the plasticized polyamide resin pellets, wherein the improvement comprises providing polyamide resin pellets which exhibit improved plasticization properties comprising 55 to 85% by weight of a polyamide resin, 10 to 40% by weight of a filler, and 0.3 to 2.0% by weight of an internal lubricant selected from the group consisting of (a) esters of higher alcohols and higher fatty acids, and (b) partial esters of polyhydric alcohols and higher fatty acids, and coating the polyamide resin pellets with from about 0.3 to 3.0% by weight, in relation to the polyamide resin pellets, of an external lubricant prior to plasticizing the polyamide resin pellets.

5. The process of claim 4, wherein the external lubricant is selected from the group consisting of hydrocarbon oil, higher aliphatic alcohols, higher fatty acids, fatty acid metal salts, fatty acid esters and fatty acid amide derivatives.

6. Molded articles prepared in accordance with the process of claim 4.

* * * * *